United States Patent [19]

Stringer

[11] Patent Number: 5,002,172
[45] Date of Patent: Mar. 26, 1991

[54] ELECTRICALLY ACTUATED SEAT ACTUATOR AND LOCK

[75] Inventor: Calvin R. Stringer, Saugus, Calif.

[73] Assignee: P. L. Porter Company, Woodland Hills, Calif.

[21] Appl. No.: 363,617

[22] Filed: Jun. 7, 1989

[51] Int. Cl.[5] .................................... F16D 71/00
[52] U.S. Cl. .................... 192/142 R; 74/89.15; 74/428.8 B; 74/424.8 B; 192/150
[58] Field of Search .................... 192/142 R, 141, 150; 74/424.8 B, 89.15, 89.14; 297/361

[56] References Cited

U.S. PATENT DOCUMENTS

| | | | |
|---|---|---|---|
| 2,418,351 | 4/1947 | Jackson | 192/142 R |
| 2,482,464 | 9/1949 | Chapman | 192/142 R |
| 2,660,029 | 11/1953 | Geyer | 74/89.14 X |
| 2,837,930 | 6/1958 | Desmond | 192/141 X |
| 3,534,630 | 10/1970 | Schwerdhofer | 74/89.14 X |
| 4,342,354 | 8/1982 | Leivenzon et al. | 192/141 X |
| 4,346,728 | 8/1982 | Sulzer | 74/89.15 X |
| 4,459,867 | 7/1984 | Jones | 74/89.15 |

Primary Examiner—Rodney H. Bonck
Attorney, Agent, or Firm—Beehler & Pavitt

[57] ABSTRACT

An electrically driven lockable actuator for an airline seat assembly is provided with an extendable and retractable actuator arm driven through a gear train by an electric motor. The actuator arm can be locked or unlocked through the gear train to the electric motor by manual activation of a clutch mechanism. Regardless of whether the actuator arm is locked or unlocked, the position of the actuator arm is copied by a follower extending exterior to the actuator. The follower is adjustable to selectively activate limit switches to disconnect power to the driving motor. The switch arm is compact and mounted on the actuator so that electrical control of the motor relative to the operation of the lockable actuator is realized without reference to the nature of the design of the seat assembly.

1 Claim, 2 Drawing Sheets

ELECTRICALLY ACTUATED SEAT ACTUATOR AND LOCK

BACKGROUND OF THE INVENTION

1. Field of the Invention

The invention relates in general to seat actuators and locks and in particular to electrically actuated actuators and locks as used in adjustable airline seating.

2. Description of the Prior Art

The seat backs and foot rests of airline seats are typically adjustable by the user through a range of positions. The user expects to adjust various elements of the airline seat in a smoothed, damped and completely arbitrarily adjustable position. The user has come to expect that a portion of the seat, such as the seat back, can be positioned at any point within a certain range by activation of a single control and then securely locked in the arbitrarily selected position by release of the control.

Furthermore, the purchaser of such airline seating expects that the mechanisms through which such seat adjustments are provided not only operate smoothly in the manner expected by the user, but must be extremely reliable and arbitrarily adjustable by airline service personnel. Airline seating frames are expected to operate largely trouble free with heavy use through their entire 10-20 year lifetime. In other words, the airline expects a single seat actuator mechanism to be usable and adjustable in all of the seats of the airplane.

For example, some seats, such as those in first class, have a greater pitch or spacing which allows inclination of the seat back to a greater degree. On the other hand, the pitch or longitudinal spacing of tourist or business class seating is less and inclination of the seat back must be somewhat more limited in order to avoid interference between adjacent passengers. Still further, some seats are situated next to bulkheads, exits or emergency exits and must similarly be restricted in their movement by virtue of available space or safety regulations. A single adjustable mechanism must be provided for each of these conditions in addition to meeting all the other requirements and expectations of the user.

The simplest prior art locking and actuating seat mechanism is a mechanical mechanism such as commonly used in passenger automobiles. Typically, these mechanical mechanisms are not damped, but are spring loaded and can be adjusted only into one of a discrete plurality of positions. Such mechanical mechanisms are also traditionally less reliable and more difficult to operate.

Mechanical activating locking mechanisms are also found in airline seats. Typically, the locking mechanism may be a separate element from the adjusting mechanism or may be combined in a single unit which is hydraulically actuated. Many such prior mechanisms are manually activated in that the portion of the seat which is to be adjusted is manually forced into the desired position while the locking mechanism is released. The locking mechanism is actuated and the seat is then left in the last manually adjusted position.

However, users of preferred airline services have come to expect or appreciate automatic or electrically actuated seat adjustment mechanisms, but still demand the control features typical of prior art hydraulic locking mechanisms.

One prior art methodology used to supply this need is to provide an electrical actuator which moves the seat part in combination with a conventional hydraulic locking mechanism. The electrical actuator and hydraulic lock are then cross-coupled through a single control through a series of linkages and cables to effect the desired operation. However, the complexity of operation of such a combination compromises its reliability, its cost is increased and field service installation and adjustment of multiple cables and complex linkages becomes problematic.

Therefore, what is needed is an electrically actuated seat mechanism which includes both adjustment and locking functions within a single mechanism.

BRIEF SUMMARY OF THE INVENTION

The invention is a single actuating and locking apparatus for an arbitrarily adjustable seat assembly. An extendable and retractable tube mechanism adapted for coupling to the adjustable seat assembly is provided. An actuator mechanism for selectively extending and retracting the tube mechanism is coupled to the tube mechanism. A locking mechanism for selectively locking the tube mechanism in an arbitrarily selected position is coupled to the tube mechanism. A limit mechanism provides arbitrarily adjustable limits of extension and retraction of the extendable and retractable tube mechanism. The limit mechanism is coupled to the tube mechanism at all times regardless of operation of the locking mechanism and is compactly positioned at a predetermined location within the apparatus regardless of the nature of the seat assembly.

As a result, a universally controlled and actuated actuating and locking apparatus is provided.

In the illustrated embodiment actuator mechanism for selectively extending and retracting the tube mechanism is electrically driven. However, if could be mechanically, or hydraulically driven in a manner consistent with the teachings of the invention.

The limit mechanism comprises a plurality of limit switches adapted to be operatively connected to selectively disable the actuator mechanism. The locking mechanism comprises a manually actuatable clutch.

The apparatus may further comprise an overload mechanism for automatically and selectively activating the manual clutch within the locking mechanism to unlock the apparatus.

The actuator mechanism comprises a driven rotatable shaft. The tube mechanism comprises a tube assembly telescopically disposed and threadably connected to the shaft. The tube assembly is telescopically extended or retracted by rotation of the driven shaft. The limit mechanism comprises a switch arm and sleeve assembly threadably coupled to the driven shaft. The switch arm and sleeve assembly are longitudinally displaced correspondingly to extension and retraction of the tube assembly.

The invention can also be characterized as a lockable actuator for use in an adjustable seat assembly comprising a housing, and a gear drive mechanism disposed in the housing. The gear drive mechanism is adapted to receive a driving torque. A rotatable shaft is also provided. A clutch selectively couples the shaft to the gear mechanism so that the shaft is selectively rotated by the gear mechanism when the clutch is engaged and is selectively freed from the gear mechanism when the clutch is disengaged. A telescopic actuating member is coupled to the shaft, is movable at least between a first and second position, and is operative to provide an actuating force in response to rotation of the shaft. A limit follower member is coupled to the shaft operative to assume at least a first and second position in response to rotation of the shaft. The first and second position of the limit follower member corresponds to the predetermined first and second position respectively of the telescopic actuating member.

As a result, a compact actuating and lockable actuator is provided adaptable for limitation and control of the telescopic actuating member regardless of the nature of the seat assembly.

The actuator further comprises a limit switch mechanism selectively contacted by the limit follower member. The limit switch mechanism operatively controls the driving torque applied through the gear mechanism to the shaft.

The position of the limit follower member is directly proportional to the position of the telescopic actuating member. The limit follower member is coupled to the telescopic actuating member through the shaft regardless of engagement or disengagement of the clutch.

The movement of the limit follower member is directly proportional to movement of the telescopic actuating member through common coupling to the shaft at a predetermined ratio. The movement of the limit follower is less than the corresponding proportional movement of the actuating member.

The invention is still further characterized as a method for selectively and universally limiting movement of a lockable actuator within a seat assembly comprising the steps of moving an actuating member in a predetermined direction by an arbitrary amount to manipulate the seat assembly. A limit follower member is moved by a reduced amount corresponding to movement of the actuating member. Movement of the actuating member by sensing reduced movement of the limit follower member is then limited.

As a result, manipulation of portions of the seat assembly is selectively limited without limitation by the nature of the seat assembly.

The movement of the limit follower is directly proportional to movement of the actuating member through mechanical linkage between the limit follower member and actuating member.

The method further comprises the step of selectively locking the actuating member to prevent movement of the actuating member, and automatically unlocking the actuating member to allow movement of the actuating member and the limit follower member when an overload force is applied to the actuating member.

The method may also further comprise the step of selectively locking the actuating member to prevent movement of the actuating member, wherein direct proportionality between movement of the limit follower member and the actuating member is retained regardless of whether the actuating member is selectively locked or not.

The invention and its various embodiments are best visualized by turning to the following drawing wherein like elements are referenced by like numerals.

BRIEF DESCRIPTION OF THE DRAWINGS

FIG. 3 is an end cross-sectional view of the mechanism shown in FIG. 2 taken through section lines 3—3.

DETAILED DESCRIPTION OF THE PREFERRED EMBODIMENTS

An electrically driven lockable actuator for an airline seat assembly is provided with an extendable and retractable actuator arm driven through a gear train by an electric motor. The actuator arm can be locked or unlocked through the gear train to the electric motor by manual activation of a clutch mechanism. Regardless of whether the actuator arm is locked or unlocked, the position of the actuator arm is copied by a follower extending exterior to the actuator. The follower is adjustable to selectively activate limit switches to disconnect power to the driving motor. The switch arm is compact and mounted on the actuator so that electrical control of the motor relative to the operation of the lockable actuator is realized without reference to the nature of the design of the seat assembly.

Figure 1:
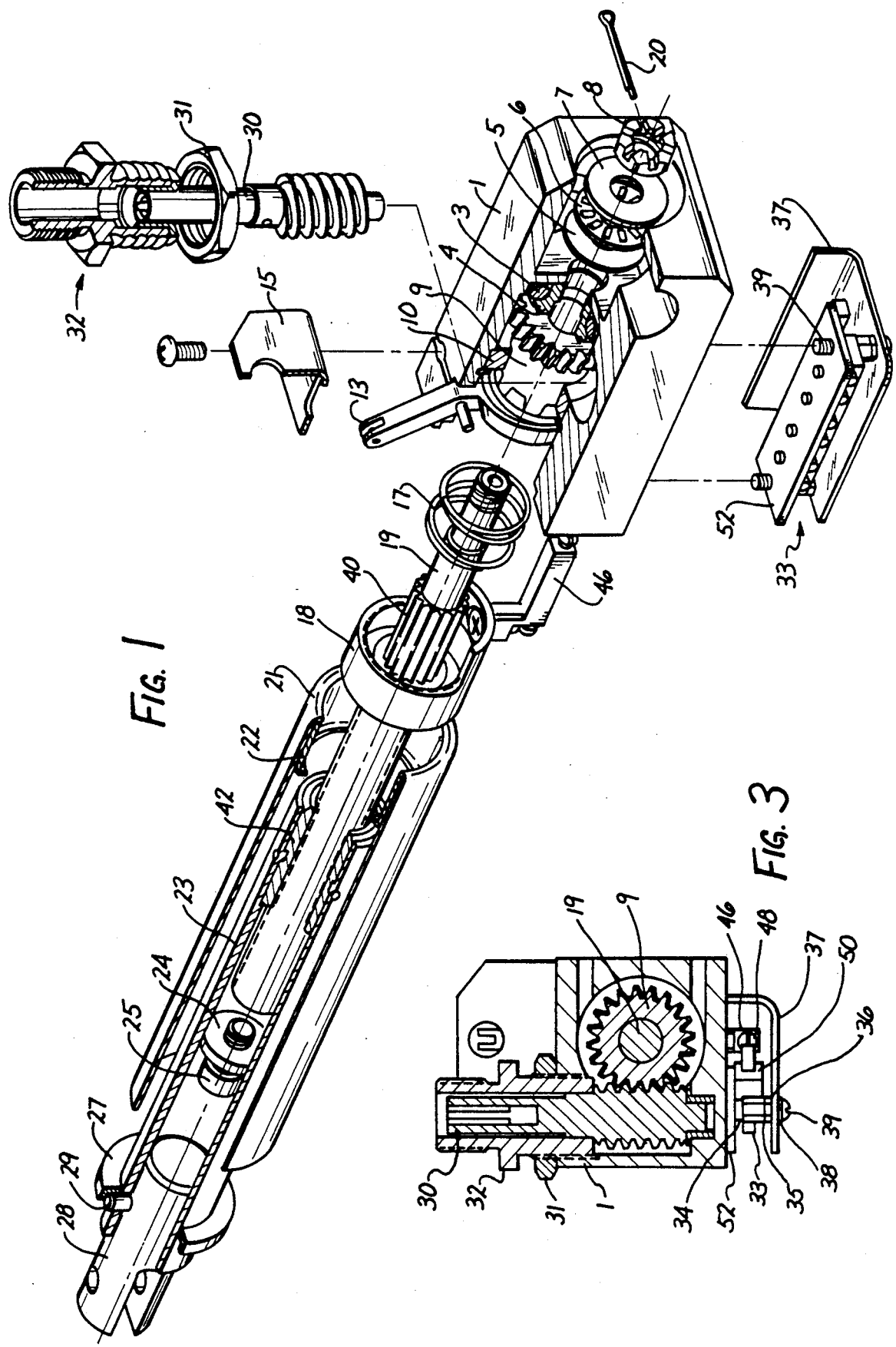
FIG. 1 is a simplified exploded partially cutaway perspective view of the invention.

The mechanical output of an electrical motor (not shown) is mechanically coupled via a shaft or cable to motor input boss assembly 32 as shown in FIGS. 1 and 3. Boss assembly 32 is screwed into a housing assembly 1 and secured thereto by means of a check nut 31. Telescopically disposed within boss assembly 32 is a shaft and worm gear assembly 30. Shaft and worm gear assembly 30 is appropriately journaled within boss assembly 32 and housing 1 as best depicted in FIG. 3 and is engaged with a worm drive jaw clutch 9 depicted in perspective view in FIG. 1, cross-sectional view in FIG. 2 and plan view in FIG. 3.

Figure 2:
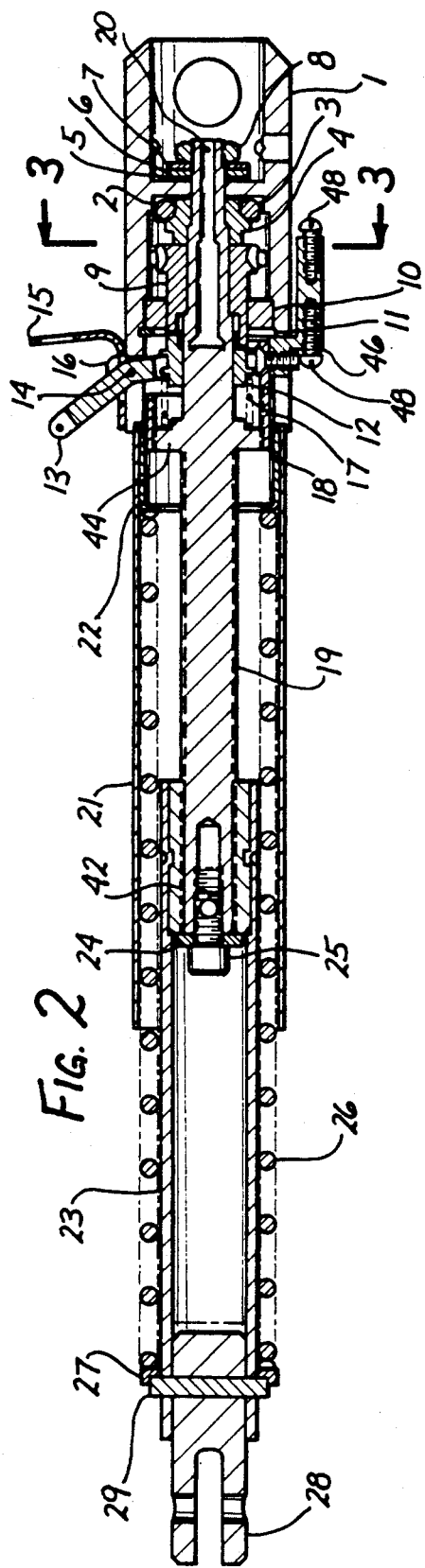
FIG. 2 is a longitudinal cross-sectional view of the invention shown in FIG. 1.

Worm drive jaw clutch 9 has a bevelled gear provided at one end and a tooth clutch assembly at the opposing end. Jaw clutch 9 is rotatably journaled about the right end of screw and shaft assembly 19 as depicted in FIG. 2. Therefore, worm drive jaw clutch 9 rotates freely about screw and shaft 19. As best depicted in FIG. 2, the right end of jaw clutch 9 is supported by a bearing race 4 which is also freely rotatable about the right end of shaft 19. Bearing race 4 in turn rides on ball bearings 3 carried within forward race 2. Forward race 2 is seated within a conforming recess defined within housing 1. Shaft 19 continues to the right in FIG. 2 through the interior wall of housing 1 which serves to hold forward race 2, and carries thrust washer 5, thrust bearing 6, thrust washer 7 and castellated nut 8 which is fixed through shaft 19 by cotter pin 20, best shown in FIG. 1, disposed through a transaxial bore defined in the end of shaft 19. Therefore, both tensile and compressive forces exerted upon shaft 19 are borne upon bearing surfaces with respect to housing 1.

Worm drive jaw clutch 9 is securely retained in its radial position within housing 1 by means of radial bearing 10 which in turn is captured within housing 1 by retaining ring 11.

To the left of worm drive jaw clutch 9 in FIG. 2 is a splined jaw clutch 12. Splined jaw clutch 12 is coupled to shaft 19 through internal splines defined within splined jaw clutch 12 and external splines 40 defined on shaft 19 best shown in FIG. 1. Therefore, splined jaw clutch 12 is free to be longitudinally displaced on shaft 19 on splines 40.

Splined jaw clutch 12 is coupled to machined yoke 13 by means of two opposing pins extending from yoke 13 into a circumferential collar defined in splined jaw clutch 12 best shown in cross-sectional view in FIG. 2.

Yoke 13 pivots about dowel pin 14 and therefore acts as a clutching lever to longitudinally displace splined jaw clutch 12.

Splined jaw clutch 12 is normally resiliently forced into an engaged configuration with worm drive clutch 9 by means of compression spring 17. The clutch assembly, including splined jaw clutch 12 and worm drive jaw clutch 9, is disengaged by clockwise rotation of yoke 13 about dowel pin 14 shown in FIG. 2. Yoke 13 is normally connected by a cable to a remote manual control, but may also be actuated by means described below.

Therefore, it can now be appreciated that drive provided by the motor (not shown) through worm gear assembly 30 to worm drive jaw clutch 9 can be effectively coupled or disconnected to shaft 19 according to rotation of yoke 13. In the presently illustrated embodiment, the clutch mechanism just described is normally engaged by spring 17, but it is entirely within the scope of the invention that the normal configuration could also be the disengaged condition by making modifications consistent with the teaching of the present invention.

The exterior left portion of shaft 10 is threaded as indicated by the dotted outline in FIGS. 1 and 2. A support tube 23 is threadably connected to shaft 19 through an internally threaded collar 42. Collar 42 is press-fit within the end of support tube 23 and longitudinal movement of support tube 23 relative to shaft 19 is limited by stop washer 24 held in place in the end of shaft 19 by means of screw 25. Support tube 23 is rotationally fixed relative to shaft 19 and is shown in the fully extended position in FIG. 2. The left end of support tube 23 is coupled to an attaching end fixture 28 held to support tube 23 by means of a dowel pin 29. In the illustrated embodiment, a compression spring 26 is concentrically disposed around the outside of support tube 23 and shaft 19. Spring 26 is held in place at its left end in FIG. 2 by means of an aft spring support 27 and at its right end in FIG. 2 by means of a forward spring support 22. Spring 22 thereby provides a bias or loading which tends to keep support shaft 23 in its most extended configuration as shown in FIG. 2. However, rotation of shaft 19 will draw support tube 23 to the right in FIG. 2 along shaft 19, thereby compressing spring 26.

Spring 26 is held along at least part of its longitudinal length by means of a guide tube 21. Guide tube 21 is fixed to forward spring support 22 and serves as a means of containing or guiding spring 26 for at least that portion of spring 26 which is not disposed outside or supported by support tube 23. Forward spring support 22 and/or guide tube 21 in turn are fixed to housing 1. Longitudinally slideable within both housing 1 and forward spring support 22 is a switch arm and sleeve assembly 18 shown in cross-sectional view in FIG. 2, but better separately depicted in the exploded view of FIG. 1.

Switch arm and sleeve assembly 18 is internally threaded and coupled to a threaded collar portion 44 of shaft 19. A bottom portion of switch arm and sleeve assembly 18 extends through a slot defined in the bottom of housing 1 to provide a cantilevered exteriorly exposed limit switch arm 46. Limit switch arm 46 as best depicted in FIG. 1 is aligned in the longitudinal direction of the locking mechanism and thus reciprocates in the same direction as and with support tube 23. Each end of arm 46 is provided with an adjustment nut 48 which is used to contact a limit switch held within a switch assembly 33, not shown in FIG. 2, but shown in FIG. 1 and best shown in the end sectional view of FIG. 3.

Turning to FIG. 3, it can be seen that limit switch assembly 33 is fixed to housing 1 by means of screw 39 and lock washer 38, nut 36, standoff 35 and spacer 34. Two microswitches 50, one of which is shown in the view of FIG. 3, are mounted on a spacing plate 52 so as to have their actuating levers or portions aligned with adjustment screws 48. One microswitch 50 is provided for each adjustment screw 48.

The entire microswitch assembly is thus protected by means of a switch cover 37. Therefore, as support assembly 23 is extended or retracted by rotation of shaft 19, arm 46 similarly reciprocates along the longitudinal direction of housing 1 causing the heads of adjustment screws 48 to ultimately contact one or other of microswitches 50 also fixed relative to housing 1. As seen in FIG. 3, adjustment arm 46 and screw heads 48 are positioned to be partially exposed to allow easy direct end-access to the adjustment screws 48 to provide for field adjustments of screws 48 and hence adjustable activation of limit switches 50. Limit switches 50 are electrically coupled in turn to the motor used to drive the entire actuator locking assembly.

The various component parts of the actuator and locking assembly now having been described in connection with FIGS. 1-3, the overall operation of the device can be readily understood and appreciated. By rotation of shaft worm assembly 30 in one direction or the other, shaft 19 can similarly be rotated in one direction or the other, thereby causing support tube 23 to be telescopically advanced or retracted against the bias of compression spring 26. This in turn will cause the advancement or retraction of end fitting 28.

Housing 1 is thus typically rotatably coupled to a selected portion of the seat frame while end fitting 28 is rotatably coupled to a moveable portion of the seat frame, such as the frame portion of the seat back or leg rest. The extension or retraction of support tube 23 thereby causes the seat back frame, for example, to be rotated, thereby either bringing the seat back into a fully upright position or to a fully reclined position or at an arbitrary position therebetween. The actuator locking mechanism in FIGS. 1-3 can similarly be used to adjust foot rest assemblies or seat portions.

However, as the actuator and locking mechanism of FIGS. 1-3 is operated, limit switch arm 46 also reciprocates in the longitudinal direction. The screw pitch coupling shaft 19 to switch arm and sleeve assembly 18 is substantially finer than the screw pitch coupling shaft 19 and support tube 23. In the illustrated embodiment, the ratio of the screw pitch between the two is 10:1. Therefore, for each unit of distance travelled by limit switch arm 46, support tube 23 will travel through ten units of distance.

The end positions of travel and hence the adjustment to the seat are therefore determined by fine adjustments of the screws 48. Each screw 48 will adjustable to define the end limit of movement for the seat portion. For example, the right side screw 48 in FIG. 2 may define the fully upright position of the seat back while the left side screw 48 of FIG. 2 may define the fully reclined position of the seat back. Therefore, a single seat actuator and locking mechanism can be utilized for first class seating, tourist or business seating, or seats occupying special restricted positions within the aircraft simply by adjustment of screws 48.

It should be particularly noted that the actuator of the present invention allows extremely compact placement of limit switches 50 directly on actuator housing 1. Typically, seat adjustment assemblies of the prior art place limit switches at selected points on the frame assembly or positions proximate to the operative portions of the actuator in order to control or limit actuator performance. Placement of the limit switches in the prior art depended upon the overall operation of the actuator relative to the seat frame as well as design details of the seat frame in question. Placement would thus vary from one type of seat to the other and from one type of installation within a given seat design to another. The design of the present invention incorporates placement and operation of the limit switches compactly and directly on the actuator as a universal assembly usable with any type of seat design or frame and within any type of installation within a seat design.

The actuator is locked by virtue of the gearing provided through the actuator mechanism to the electric motor. Therefore, as long as shaft 19 is coupled through the jaw clutch combination 9,12 to the electric motor, any extension or retraction of support tube 23 is virtually prohibited. However, when yoke 13 is rotated, such as through a manually activated cable attachment, clutch combination 9,12 is disengaged and shaft 19 is allowed to spin free under a manual retraction or extension of end fitting 28 and support tube 23.

However, it should be particularly noted that even when clutch combination 9,12 is disengaged and the device configured in an unlocked state, end fitting 28 and support tube 23 are positively coupled through collar portion 44 to switch arm and sleeve assembly 18 and thus limit switch arm 46. Therefore, no matter whether locked or unlocked, and no matter in what position the actuator may be put or left, the operation and configuration of the limit switch mechanism remains intact and operable. This is of particular utility when, for example, the power within the aircraft provided to the seating fails or is disconnected. The seating may still be manually adjusted and locked since the inoperative motor provides the braking or locking force. Nevertheless, when power is restored, resetting or adjustment of the actuator and locking mechanism is unnecessary regardless of how the motor drive controls may have been left or in what position they may have been when power is restored. In any case, no damage or misoperation of the electrical seat actuator can occur as a result of power loss and restoration.

Figure 4:
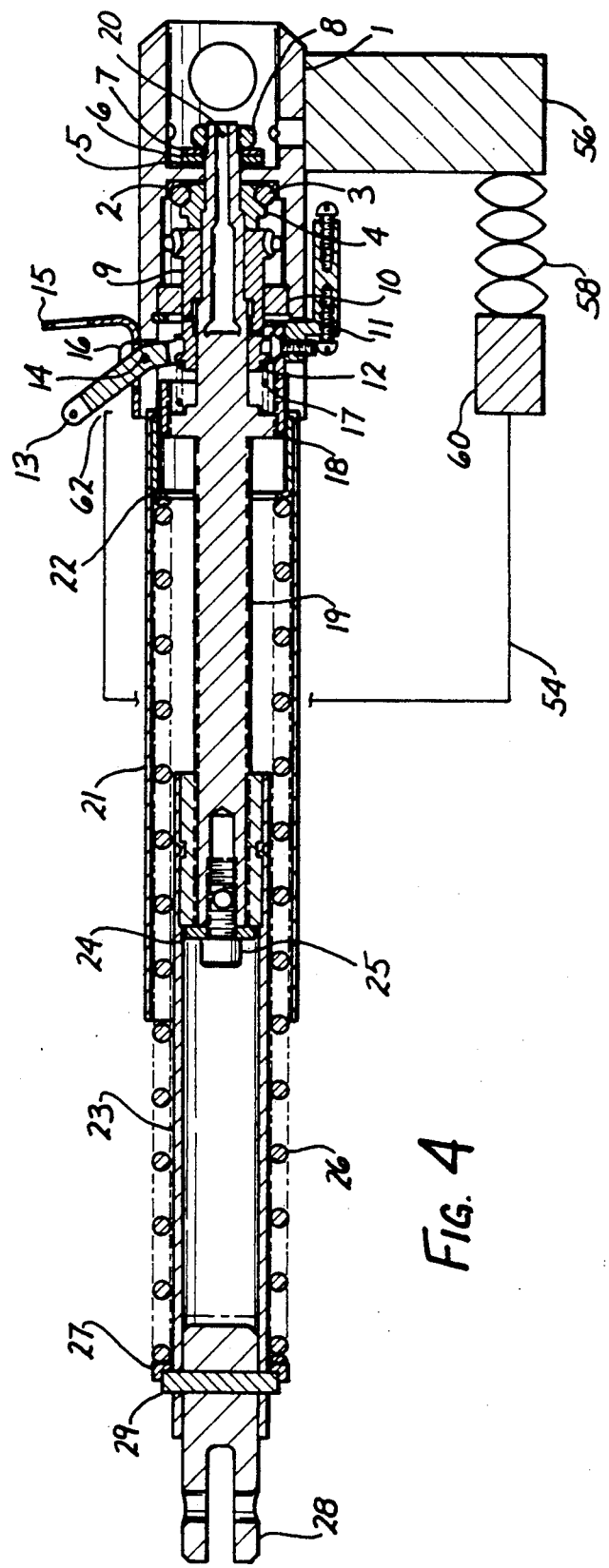
FIG. 4 is a simplified diagrammatic view of one embodiment of the invention wherein load limitation is utilized to automatically release the locking mechanism.

The actuator and locking mechanism of FIG. 1-3 may be further modified to include an automatic overload release such as diagrammatically depicted in FIG. 4. Housing 1 of the actuator is disposed within a sheet metal casing 54. Housing 1 in turn is fixed to a mounting block 56 which serves to mount or suspend housing 1 within casing 54. Thus, housing 1 and the actuator assembly in general is free to move with respect to casing 54 to the same extent as mounting block 56. Mounting block 56 in turn is connected through a spring mechanism, such as a bellows spring 58, to a stationary mounting block 60 connected or fixed to casing 54. Therefore, when a large amount of force is exerted upon the actuator, as may occur when a passenger stands upon a connected footrest while the actuator is in the locked configuration, spring bellows 58 will allow the entire actuator and actuator housing to be compressed backwardly within casing 54, which is fixed relative to the seat frame.

However, as shown in the simplified diagram of FIG. 4, casing 54 extends toward yoke 13 to define a forward edge 62. The forward edge 62 of casing 54 proximate to yoke 13 will thus ultimately be placed in contact with the right side of yoke 13 as shown in FIG. 4. Continued compression of the actuator and actuator housing 1 into casing 54 by a large force thereby forces yoke 13 to ultimately rotate, causing clutch combination 9,12 to disengage thereby unlocking the actuator. This will then permit the forced portion of the seat, such as the footrest, to be retracted under the applied force without damage to the seat mechanism and without the need for manually unlocking the actuator.

Many alterations and modifications may be made by those having ordinary skill in the art without departing from the spirit and scope of this invention. Therefore, it must be expressly understood that the illustrated embodiment has been set forth only for the purposes of clarification and example and should not be taken as limiting the invention as defined by the following claims.

I claim:

1. A single actuating and locking apparatus for an arbitrarily adjustable seat assembly comprising:
   an extendable and retractable tube means adapted for coupling to said adjustable seat assembly;
   actuator means for selectively extending and retracting said tube means and coupled to said tube means;
   locking means for selectively locking said tube means in an arbitrarily selected position and coupled to said tube means, wherein said locking means comprises a manually actuatable clutch;
   limit switch means for providing arbitrarily adjustable limits of extension and retraction of said extendable and retractable tube means, said limit means coupled to said tube means at all times regardless of operation of said locking means and compactly positioned at a predetermined location within said apparatus regardless of the nature of said seat assembly; and
   overload means for automatically and selectively activating said manual clutch within said locking means to unlock said apparatus,
   whereby a universally controlled and actuated actuating and locking apparatus is provided.

2. A single actuating and locking apparatus for an arbitrarily adjustable seat assembly comprising;
   an extendable and retractable tube means adapted for coupling to said adjustable seat assembly;
   actuator means for selectively extending and retracting said tube means and coupled to said tube means;
   locking means for selectively locking said tube means in an arbitrarily selected position and coupled to said tube means; and
   limit switch means for providing arbitrarily adjustable limits of extension and retraction of said extendable and retractable tube means, said limit means coupled to said tube means at all times regardless of operation of said locking means and compactly positioned at a predetermined location within said apparatus regardless of the nature of said seat assembly;
   wherein said actuator means comprises a driven rotatable shaft, wherein said tube means comprises a tube assembly telescopically disposed and threadably connected to said shaft, said tube assembly telescopically extended or retracted by rotation of said driven shaft, and wherein said limit means comprises a switch arm and sleeve assembly threadably coupled to said driven shaft, said switch arm and sleeve assembly being longitudinally displaced corresponding to extension and retraction of said tube assembly, whereby a universally controlled and actuated actuating and locking apparatus is provided.

3. The apparatus of claim 2 wherein said actuator means for selectively extending and retracting said tube means is electrically driven.

4. The apparatus of claim 3 wherein said limit means comprises a plurality of limit switches adapted to be operatively connected to selectively disabled said actuator means.

5. The apparatus of claim 2 wherein said locking means comprises a manually actuatable clutch.

6. The apparatus of claim 5 further comprising overload means for automatically and selectively activating said manual clutch within said locking means to unlock said apparatus.

7. A method for selectively and universally limiting movement of a lockable actuator within a seat assembly comprising the steps of;

moving an actuating member in a predetermined direction by an arbitrary amount to manipulate said seat assembly;

moving a limit follower member by a reduced amount corresponding to movement of said actuating member; and limiting movement of said actuating member by sensing reduced movement of said limit follower member, selectively and positively locking said actuating member to a loaded gear train to prevent movement of said actuating member; and providing a resistive spring coupled to said actuating member compressible by a predetermined amount to unlock said actuating member;

compressing said resistive spring by said predetermined amount, the force needed to compress said resistive spring equalling a predetermined over load force applied to said seat assembly; and automatically unlocking said actuating member to allow movement of said actuating member and said limit follower member when said predetermined overload force is applied to said actuating member by actuating a clutch mechanism coupled to said actuating member to decouple said actuating member from said gear train, whereby manipulation of portions of said seat assembly is selectively limited without limitation by the nature of said seat assembly.

* * * * *